US011048879B2

(12) United States Patent
Buhrmann et al.

(10) Patent No.: US 11,048,879 B2
(45) Date of Patent: Jun. 29, 2021

(54) SYSTEMS AND METHODS TO DETERMINE AND UTILIZE SEMANTIC RELATEDNESS BETWEEN MULTIPLE NATURAL LANGUAGE SOURCES TO DETERMINE STRENGTHS AND WEAKNESSES

(71) Applicant: Vettd, Inc., Bellevue, WA (US)

(72) Inventors: Andrew Buhrmann, Redmond, WA (US); Michael Buhrmann, North Bend, WA (US); Ali Shokoufandeh, New Hope, PA (US); Jesse Smith, Bellevue, WA (US)

(73) Assignee: Vettd, Inc., Bellevue, WA (US)

( * ) Notice: Subject to any disclaimer, the term of this patent is extended or adjusted under 35 U.S.C. 154(b) by 162 days.

(21) Appl. No.: 16/011,143

(22) Filed: Jun. 18, 2018

(65) Prior Publication Data

US 2018/0365229 A1   Dec. 20, 2018

Related U.S. Application Data

(60) Provisional application No. 62/521,792, filed on Jun. 19, 2017, provisional application No. 62/647,518, filed on May 23, 2018.

(51) Int. Cl.
*G06F 40/00* (2020.01)
*G06F 40/30* (2020.01)
(Continued)

(52) U.S. Cl.
CPC .......... *G06F 40/30* (2020.01); *G06F 16/9024* (2019.01); *G06F 40/211* (2020.01);
(Continued)

(58) Field of Classification Search
CPC ...... G06F 30/27; G06F 11/2263; G06F 40/20; G06F 40/295
See application file for complete search history.

(56) References Cited

U.S. PATENT DOCUMENTS 8,463,810 B1   6/2013   Rennison
2007/0250378 A1   10/2007   Hughes et al.
(Continued)

FOREIGN PATENT DOCUMENTS

WO   1997/08604 A2   3/1997
WO   2011/119171 A2   9/2011

OTHER PUBLICATIONS

Z. Xiao, T. N. de Silva, C. Wei, K. Mao and G. Ng, "Constructing Bayesian networks by harvesting knowledge from online resources," 2016 19th International Conference on Information Fusion (Fusion), Heidelberg, 2016, pp. 106-113. (Year: 2016).*

(Continued)

*Primary Examiner* — Edgar X Guerra-Erazo
(74) *Attorney, Agent, or Firm* — Richard T. Black; Foster Garvey PC

(57) ABSTRACT

A microprocessor executable method transforms unstructured natural language texts by way of a preprocessing pipeline into a structured data representation of the entities described in the original text. The structured data representation is conducive to further processing by machine methods. The transformation process is learned by a machine learned model trained to identify relevant text segments and disregard irrelevant text segments The resulting structured data representation is refined to more accurately represent the respective entities.

2 Claims, 7 Drawing Sheets

(51) Int. Cl.
*G06N 20/00* (2019.01)
*G06F 16/901* (2019.01)
*G06N 3/08* (2006.01)
*G06N 3/04* (2006.01)
*G06N 5/02* (2006.01)
*G06N 5/00* (2006.01)
*G06F 40/211* (2020.01)
*G06F 40/216* (2020.01)
*G06F 40/247* (2020.01)
*G06F 40/295* (2020.01)

(52) U.S. Cl.
CPC .......... *G06F 40/216* (2020.01); *G06F 40/247* (2020.01); *G06F 40/295* (2020.01); *G06N 3/0445* (2013.01); *G06N 3/0454* (2013.01); *G06N 3/084* (2013.01); *G06N 5/003* (2013.01); *G06N 5/022* (2013.01); *G06N 20/00* (2019.01)

(56) References Cited

U.S. PATENT DOCUMENTS

| | | | |
|---|---|---|---|
| 2010/0161316 | A1 | 6/2010 | Haug |
| 2010/0228693 | A1* | 9/2010 | Dawson ................ G06F 16/322 706/12 |
| 2011/0106821 | A1 | 5/2011 | Hassanzadeh |
| 2014/0075004 | A1* | 3/2014 | Van Dusen ....... G06F 16/90335 709/223 |
| 2014/0229161 | A1 | 8/2014 | Gliozzo |
| 2015/0046356 | A1 | 2/2015 | Millmore et al. |
| 2015/0127567 | A1 | 5/2015 | Menon et al. |
| 2016/0232160 | A1 | 8/2016 | Buhrmann et al. |
| 2017/0011037 | A1 | 1/2017 | Qian et al. |
| 2017/0185904 | A1* | 6/2017 | Padmanabhan .......... G06N 5/04 |

OTHER PUBLICATIONS

F. Brauer, M. Schramm, W. Barczynski, A. Loser and H. Do, "Robust recognition of complex entities in text exploiting enterprise data and NLP-techniques," 2008 Third International Conference on Digital Information Management, London, 2008, pp. 551-558, doi: 10.1109/ICDIM.2008.4746780. (Year: 2008).*
Muzaffar, A. W., Azam, F., & Qamar, U. (2015). A Relation Extraction Framework for Biomedical Text Using Hybrid Feature Set. Computational and mathematical methods in medicine, 2015, 910423. https://doi.org/10.1155/2015/910423 (Year: 2015).*
International Search Report and Written Opinion for PCT/US2015/062731, dated May 16, 2016, 12 pages.
Hochreiter, Sepp; and Schmidhuber, Jürgen; Long Short-Term Memory, Neural Computation, 9(8):1735-1780, 1997.
Tomas Mikolov, Kai Chen, Greg Corrado, Jeffrey Dean, "Efficient Estimation of Word Representations in Vector Space," 12 pages, 2013. arXiv:1301.3781.
Quoc Le, Tomas Mikolov ; Proceedings of the 31st International Conference on Machine Learning, PMLR 32(2):1188-1196, 2014.
Kim, Y. (2014). Convolutional Neural Networks for Sentence Classification. Proceedings of the 2014 Conference on Empirical Methods in Natural Language Processing (EMNLP 2014), 1746-1751.
Extended European Search Report, EP Application No. 15862848.7, dated Apr. 9, 2018, 11 pages.
Evgeniy Gabrilovich et al., "Computing Semantic Relatedness using Wikipedia-based Explicit Semantic Analysis," IJCAI '07 Proceedings of the 20th International Joint Conference on Artificial Intelligence, Jan. 12, 2007, XP55202427, pp. 1606-1611.
C. Goller and A. Küchler, "Learning task-dependent distributed representations by backpropagation through structure," Proceedings of International Conference on Neural Networks (ICNN'96), Washington, DC, USA, 1996, pp. 347-352 vol. 1.
Schrijver, Alexander. Combinatorial optimization: polyhedra and efficiency. vol. 24. Springer Science & Business Media, 2003. [This reference is a book; copy to be provided upon Examiner request].
Srinivasan, Aravind. "Improved approximations of packing and covering problems." Proceedings of the twenty-seventh annual ACM symposium on Theory of computing. ACM, 1995.
Vazirani, Vijay V. Approximation algorithms. Springer Science & Business Media, 2013. [This reference is a book; copy to be provided upon Examiner request].
International Search Report and Written Opinion for PCT/US2018/038105, dated Oct. 16, 2018, 17 pages.

* cited by examiner

SYSTEMS AND METHODS TO DETERMINE AND UTILIZE SEMANTIC RELATEDNESS BETWEEN MULTIPLE NATURAL LANGUAGE SOURCES TO DETERMINE STRENGTHS AND WEAKNESSES

PRIORITY CLAIM

This application is a Nonprovisional claiming priority from U.S. 62/521,792 filed Jun. 19, 2017, and U.S. 62/647,518 filed Mar. 23, 2018; the contents of which are hereby incorporated by reference in their entireties as if fully set forth herein.

RELATED APPLICATIONS

This application is further related to U.S. Application Nos. 62/084,836 filed Nov. 26, 2014; 62/215,976 filed Sep. 9, 2015, Ser. No. 14/952,495 filed Nov. 25, 2015; and PCT/US2015/062731 filed Nov. 25, 2015. All of the above applications are hereby incorporated by reference in their entireties as if fully set forth herein.

FIELD OF THE INVENTION

The invention concerns semantic analysis of natural languages, and more specifically, the analysis of language text from multiple sources.

BACKGROUND OF THE INVENTION

Over the last few decades, organizations have embraced the process of digital transformation to improve record keeping on their employees, their activities and what they produce. The hope for organizational leaders was that by digitizing these records in an automatic way, it would produce an innate strategic value to use that information with ease and precision to guide workforce planning. As digital record retention continues to compound, that strategic value hasn't been fully realized and organizations of all sizes are under immense pressure to understand and implement strategies to use that information to not just capture and record but to intelligently inform leaders on how to optimize their workforce to maximize productivity based on substantive insight that was derived from their own data. The greatest gains in this area so far have been focused on optimizing pay and identifying cognitive abilities but lack supporting evidence around capabilities and domain knowledge that was identified from the complied natural language documents available. Psychometric and skill-based testing can be effective to solve contained workforce performance issues but are impractical to implement at scale and cannot be used to efficiently measure or analyze an entire workforce.

Given the immense amount of natural language digital assets contained within all organizations, the ability to understand the value of individual documents, their parts and how to drive insight across an entire organization is paramount to implementing a reliable and intelligent process to optimize the configuration and output of workforces. One of the biggest problems with previous attempts to understand the value of information was that it was not in the right context of what individual business leaders truly value most as each one has its own unique opinion and existing technologies are limited in capturing, comparing and understanding their differences and the impact it has on strategic recommendations. This invention addresses critical areas that have been overlooked by standard digital transformation practices and enables organizations to fully realize the value of the information they have been aggregating through the adoption of neural transformation which puts their data into a state of active intelligence.

SUMMARY OF THE INVENTION

In accordance with a preferred embodiment of the present invention, a microprocessor executable method to identify relationships within an information space consisting of multiple entities where those entities may each be defined and represented by a collection of natural language text, the microprocessor executable method comprises generating concept vector representations of those entities based on the collections of natural language text defining each entity, producing relatedness scores as a metric of strength of conceptual relationship between one entity and any number of other entities, building a graph of entity relatedness where the relatedness scores form the edges of the graph, and using this graph representation to calculate additional metrics about the interrelatedness of the entities.

In accordance with an alternative embodiment, a microprocessor executable method to transform unstructured natural language texts by way of a preprocessing pipeline, into a structured data representation of the entities described in the original text wherein, the structured data representation is conducive to further processing by machine methods, and the process of the transformation is learned by a machine neural network or other machine learned model trained to identify relevant text segments and disregard irrelevant text segments such that the resulting structured data representation is refined to more accurately represent the respective entities.

In accordance with yet a further embodiment of the present invention, a microprocessor executable method decomposing a natural language document into a sequence of text excerpts or segments, the microprocessor executable method comprises dividing the text into a sequence of small fragments, using a machine learned model to classify each possible recombination of those fragments, and optimizing over the possible result sequences to obtain an ideal segmentation.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

This document describes a computational system for analyzing an organizational talent pool and identifying skill gaps allowing the organization to achieve its goals in performing assigned tasks. Computational tools are provided for talent pool optimization and recommendation with respect to its evolving objectives and requirements. In accordance with a preferred embodiment of the present invention, computational components (tools) include: machine-learning models based on deep neural networks to process and extract information from a variety of information sources including resumes, organizational experience requirements, job descriptions, etc.; sematic models created for the extracted information to support similarity measurement among multiple information sources; establishment of relationships among multiple information sources in the form of organizational macro services and dynamic models; and optimization methods for solving the semantic relatedness, gap and talent analysis, talent optimization and recommendation using efficient computational algorithms.

According to the preferred embodiment, a data science platform models the complexity of an organization by capturing semantic information pertaining to all its assets, resources and objectives. The functional components of this platform may be combined in a modular fashion to create services in support of organizational team and gap analysis, and team optimization. The platform utilizes the semantic model of an organization's information assets to provide a mechanism for analyzing the semantic adequacy of the team to meet its conceptual objective, identify the talent gap in its ranks, and build a recommendation model to achieve the mission critical objectives. The platform transforms information sources, which are primarily textual information, using prior semantic representation into a vector space representation along with enriched metadata. The transformed representation provide the necessary abstraction for applying advanced methods for classification such as deep neural networks as well as optimization methods for team and gap analysis.

In accordance with the preferred embodiment, a web service platform includes various macro products built upon an ecosystem of microservices and other infrastructure components such as databases, network layers, and other computer software and hardware. As utilized herein, a microservice is a component which performs a discrete processing function. A macro product is a tool or service typically providing an interface to a service and is composed of the capabilities provided by the ecosystem of microservices and infrastructure components.

Figure 1:
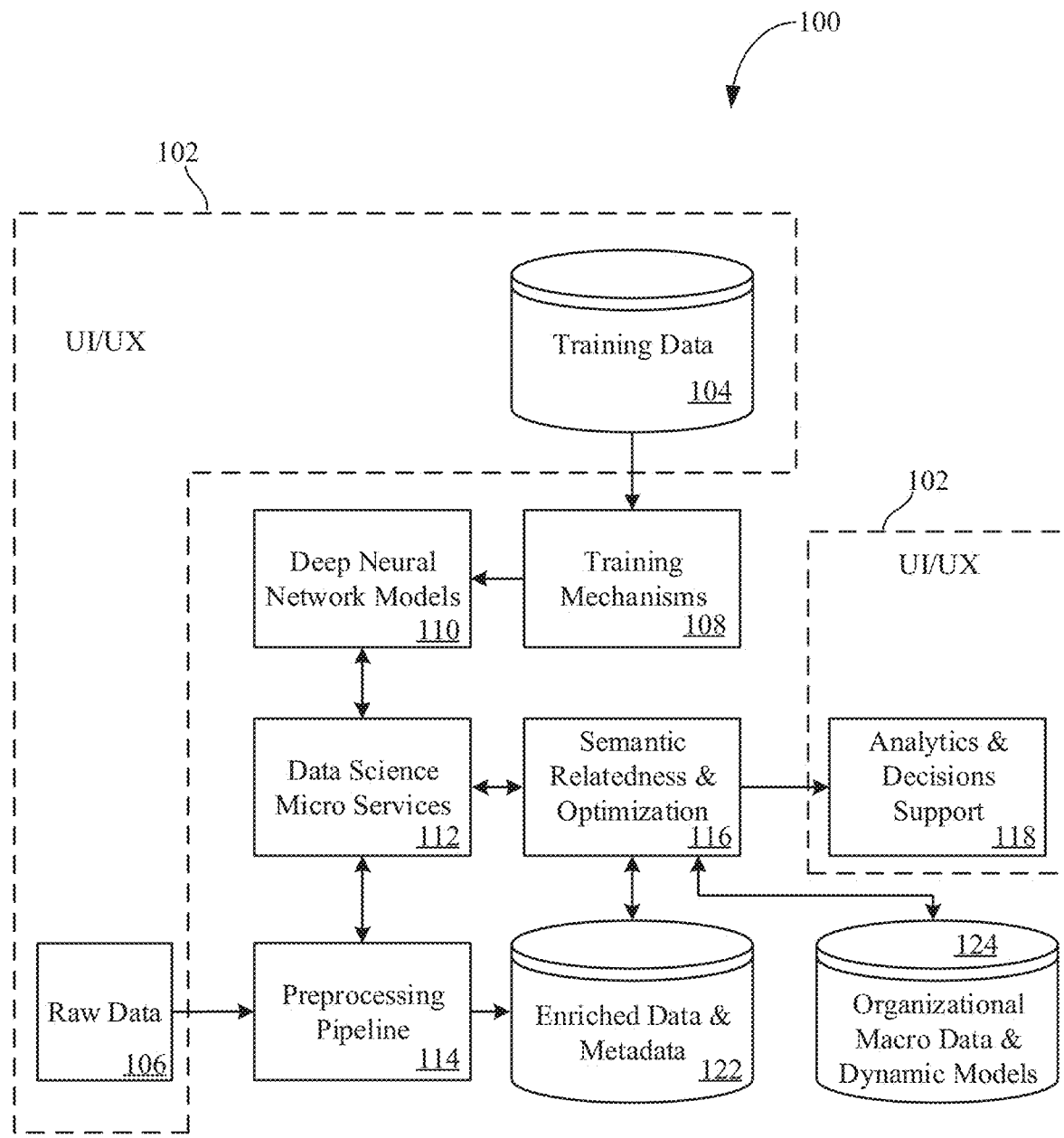
FIG. 1 is an overview of team and gap analysis, and a team optimization platform using sematic relatedness according to a preferred embodiment of the present invention.

FIG. 1 illustrates a platform, in accordance with the preferred embodiment, for team and gap analysis. The terms system and platform are used interchangeably herein, and refer to system (platform) 100. System 100 utilizes and creates four distinct data repositories. As a system that utilizes machine-learning algorithms for numerous services (micro-services), system 100 constructs neural network models. In order to generate these models, system 100 provides the necessary data curation environment and stores the resulting training data. During its operational lifecycle, system 100 receives raw data 106 from end users. These data may include, for example, resumes, organization data, team objectives, and job descriptions. System 100 also receives training data 104, such as training data related to an organization. System 100 preprocesses these raw data through its microservices including its learning algorithm and semantic encoding and generates enriched repositories and metadata for its optimization algorithms. System 100 interacts with supporting functional components 102, which include for example, user interfaces, end user interaction libraries and software components known as application program interfaces (APIs), and facilitates interaction between the system 100 and users.

The system 100 also maintains complex data sets that capture the relationship between talent pool and objectives in the form of organizational macro data & dynamic models. The platform (system 100) also contains 5 functional components denoted by blocks 108, 110, 112, 114, and 116 in FIG. 1. The learning in the platform is carried through training mechanisms, which constructs the deep neural network models. The resulting models along with mechanisms for text analysis, semantic analysis algorithm, and similarity measurements will form the subsystem denoted as data science micro services. Preprocessing pipeline 114 carries the task of preprocessing the raw data 106 through micro services. The set of macro services for talent pool optimization and structural analysis is performed by semantic relatedness and optimization.

Preprocessing pipeline 114 is one of the entry points for supplying data to platform 100. The preprocessing pipeline 114 comprises a chain of operations for refining unstructured natural language text into an enriched representation which is conducive to machine analytical treatments. Platform 100 applies this pipeline to inbound data to automatically extract relevant information and organize it into a repository for future use. Documents utilized by system 100 to capture the structure of an organization and its entities enters system 100 through this preprocessing pipeline 114 and is transformed and enrich downstream processes. While other systems that deal with structured or semi-structured textual information may have a data pipeline, there are several unique aspects to the data processing pipeline (preprocessing pipeline 114) discussed below.

Figure 2:
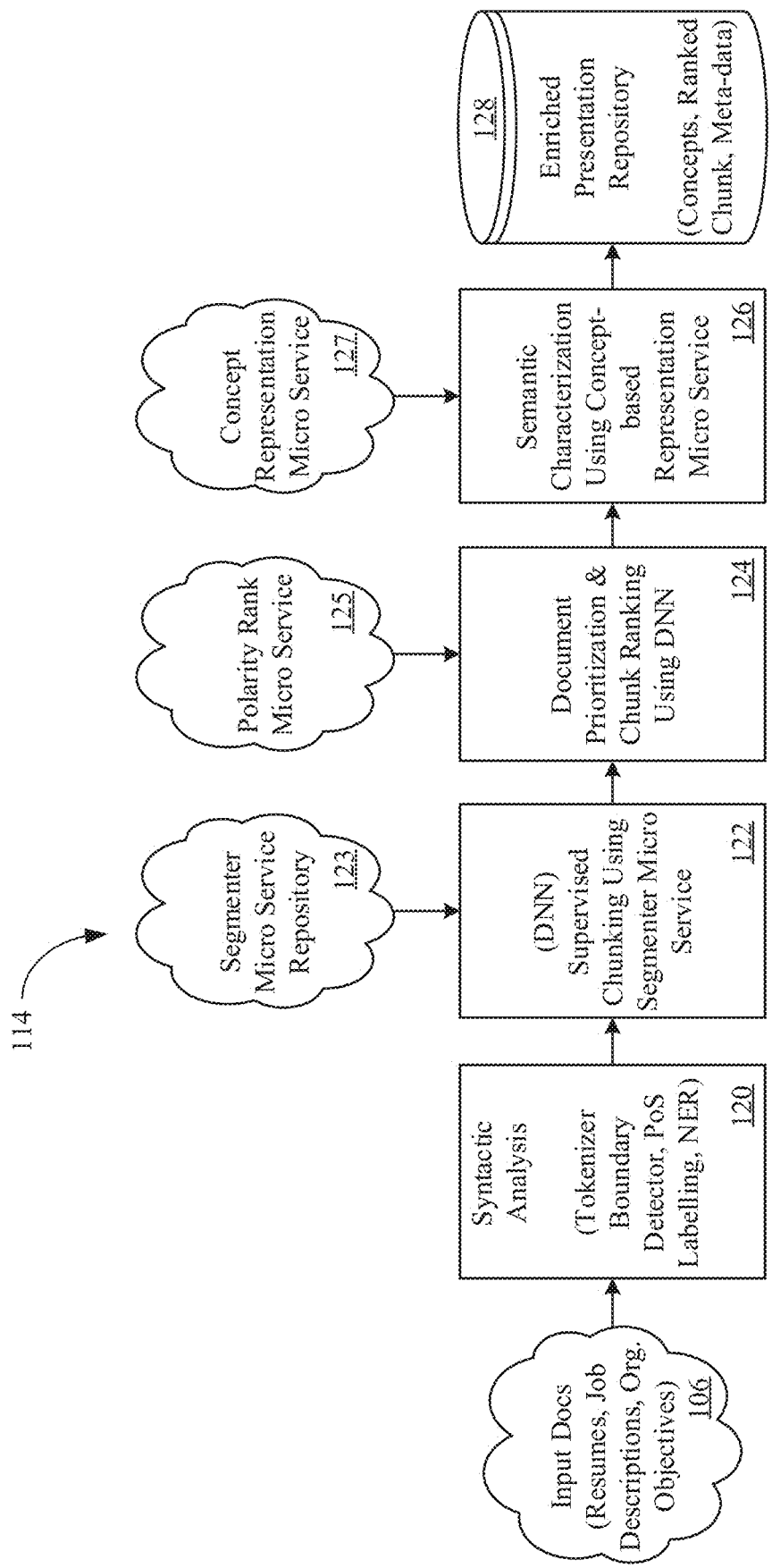
FIG. 2 illustrates functional components of a document-Preprocessing Pipeline of the platform of FIG. 1.

FIG. 2 provides an overview of functional components of the document-preprocessing pipeline 114. A fundamental problem in the field of natural language processing is the inability to accurately and reliably decompose a natural language document into discrete segments which can be individually analyzed and manipulated. This is a necessary step in many natural language processing applications. While systems and methods are known to exist to complete this task, these methods typically rely on structural queues of the document such as line breaks and punctuation to know where and how to break the document apart. This task becomes especially difficult with documents that have less of these structural queues, such as resumes, for example. Within a resume, it is typical to see bulleted lists, inconsistent punctuation, inconsistent capitalization, inconsistent spacing, special formatting characters which add space or other visual embellishments, inconsistent line break placement, inconsistent spacing, etc.

In accordance with the preferred embodiment, a supervised chunking system is designed to overcome these challenges using a novel approach to document segmentation, in which the document is first decomposed into a large sequence of small nonsensical text fragments and then recombined to and evaluated by a machine learned model to determine optimal segmentation. The machine learned model classifies sample segments from a particular document structure (resume, job description, cover letter, etc.) as either logical and good, such as how a human would recognize the segment as an appropriate and complete text excerpt, or illogical and bad, representing a segment a human would consider incomplete or able to be further divided. The system takes the sequence of fragments and visits each permutation of concatenation of fragments to form a segmented document, and used the machine learned model to rate the resulting segments. These ratings are composed into a weighted directed graph which reduces the natural language comprehension problem of segmentation to a numerical graph optimization problem.

This methodology is utilized by preprocessing pipeline 114 to break down a natural language document into constituent statements that can be analyzed individually or in context of their occurrence within the larger document. A syntactic analysis stage 120 of the preprocessing pipeline 114 performs the initial fragmentation, breaking the document down into a sequence of the smallest fragments. A supervised chunking stage 122 of the preprocessing pipeline 114 performs the subsequent recombination and optimization to produce an ideal segmented representation of the document regardless of the document's structural complexity. One additional benefit of this technique over conventional rules based segmenting systems is the machine learned model may be easily trained and updated with exposure to new sample data.

Once a robust segmentation of the document is achieved, further analytical techniques are enabled. The next stage in the preprocessing pipeline 114 is a document prioritization stage 124 where segments are classified by a machine learned model to determine if the segment contains information relevant to the analysis at hand. For example, for the purposes of analyzing the work experience of a job applicant, the machine learned model would be trained to accept action statements and descriptions of work done while rejecting contact information or education statement. The machine learned model may be trained as a general purpose model with the intention of applying the classification to all varieties of a class of document or analysis, or the model may be trained to account for the specific preferences of an individual or group. The result is a collection of segments which contain information highly relevant to the analysis at hand. These segments may be used individually or concatenated to form a summary of the entity under analysis.

At this point, the segmented form of one document may undergo many document prioritization stages in parallel where each document prioritization stage uses a different machine learned model to refine the document for different types of analyses in the future. For example, given a resume, one model may be trained to extract statements of work experience related to sales while another may be trained to extract statements of work experience related to finance. In another example, given a the 10 k annual report of a publicly traded company, one model may be trained to extract statements related to the operations of the business while another model may be trained to extract statements of business risk.

This refined version of the document, composed of concatenated highly relevant statements, is now highly conducive to the next stage of analysis within our preprocessing pipeline; semantic characterization 126. Using this relevant summary of the original document as input to the semantic characterization stage 126 constrains the semantic concept space such that it is less likely to identify relationships within the document that are not relevant to the analysis at hand and provides enriched data at component 128. This greatly enhances the accuracy and precision of semantic characterization. This utilization of machine learned models to refine the input to semantic characterization is a unique property of preprocessing pipeline 114.

System 100 interacts with other components, which may be cloud based (123, 125, 127). Segmenter Micro-service repository 123 indicates service requests between preprocessing pipeline and the micro services provided by the Data Science Micro Services (block 112) that support document segmentation through learned models. Polarity Rank Micro-Service 125 indicates service requests between preprocessing pipeline and the micro services provided by the Data Science Micro Services (block 112) that support ranking of generated segments by pipelines based on learned models. Similarly, the preprocessing pipeline establishes unsupervised representation of ranked text using service requests to Concept Representation Micro Services provided by Data Science Micro Services (block 127). As indicated in FIG. 2, Syntactic Analysis 120 is the first step of the preprocessing pipeline 114. Most documents provided to platform 100 consist of natural language text with either proper natural language structure or semi-structured text such as candidate resumes or team objectives that do not necessarily adhere to proper English language structure. The main task of the syntactic analyzer 120 is to receive a document as input and generate a stream of syntactically coherent language tokens. There are numerous and very stable available libraries to carry this step. Examples include python libraries such as NLTK (https://www.nltk.org) and SPACY (https://spacy.io). While the aforementioned libraries provide a rich set of information such as named entity recognition (NER) functionality, the platform 100 provides additional models for detecting entities to enhance the default models provided by original libraries. These models are maintained as part of functional component in functional block 110 and are invoked by micro services in functional block 112. The output of this component (120) will be a stream of enriched tokens with additional syntactical information such as part of speech, grammatical role and named entity labels.

Figure 3:
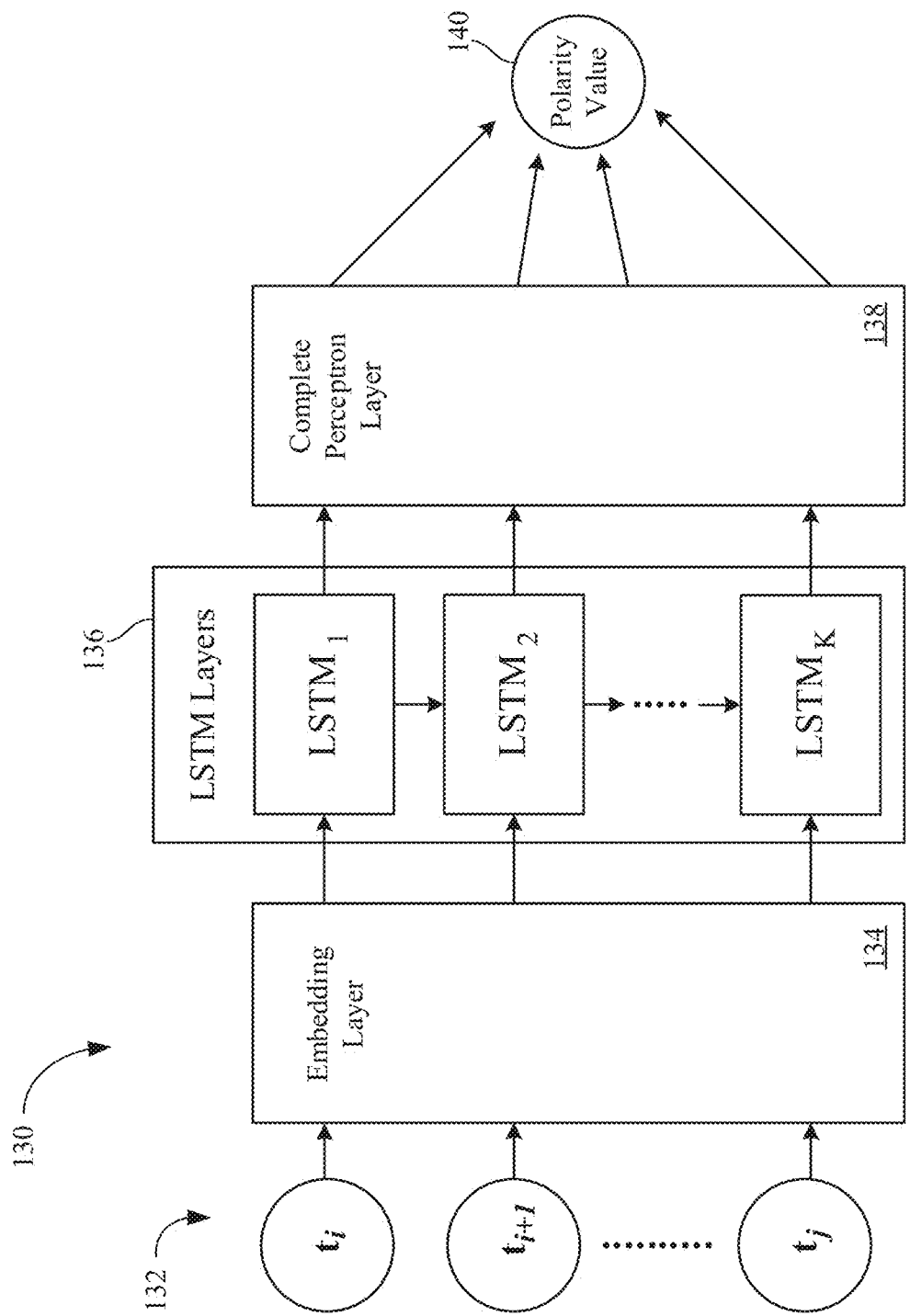
FIG. 3 illustrates steps in the Supervised Chunking Stage of the document Preprocessing Pipeline of FIG. 2.

The second step of (or stage in) preprocessing pipeline 114 is the Supervised Chunking stage 122, which creates semantically meaningful chunks of tokens produced by syntactical analyzer (120). An objective of this step is to identify a segment of the input document that carries a coherent semantic section of input document. As illustrated in FIG. 3, assume sequence T=t1, . . . , tn to denote the sequence of tokens generated by syntactical analysis, the sematic segmentation will produce ordered segments S1, . . . , Sm such that each segment Si consists of set of continues subsets of tokens in T. Moreover, the union of S1, . . . , Sm produces the original set of tokens T. Identifying the optimal chunking of a sequence T requires a solution identifying a segmentation that maximizes the sematic content of a resulting decomposition. A computational optimization algorithm for estimating the segmentation is described below.

This segmentation model 130 (see FIG. 3) assumes access to a sequence polarity measure $N(t_i, \ldots, t_j)$ as a measure of semantic content for sequence $<t_i, \ldots, t_j>$, which is referred to as semantic polarity 140. The realization of function N( ) is based on a supervised model in the form of a deep recurrent neural network (RNN) [1—Goller, C.; Küchler, A. "Learning task-dependent distributed representations by backpropagation through structure". Neural Networks, 1996., IEEE; this article is hereby incorporated by reference in its entirety as if fully set forth herein] that utilizes long short term cells (LSTM)[2—Hochreiter, Sepp; and Schmidhuber, Jurgen; Long Short-Term Memory, Neural Computation, 9(8):1735-1780, 1997; this article is hereby incorporated by reference in its entirety as if fully set forth herein]. The model for function N( ) utilizes a LSTM (RNN) motivated by the fact that accurate classification of a given sequence ti, . . . , tj 132 requires capturing the temporal dependencies of tokens. The embedding layer 134 of this network is designed to convert language elements in the token sequence to temporal vectors. This layer uses a word2vec language embedding model trained on prescribed dictionary [3—Tomas Mikolov, Kai Chen, Greg Corrado, Jeffrey Dean: Efficient Estimation of Word Representations in Vector Space. arXiv:1301.3781; this article is hereby incorporated by reference in its entirety as if fully set forth herein]. The next set of layers is LSTM layers (at step or stage 136) that capture the linguistic dependency of training data. This is a trainable layer and creating the model for this part of the architecture of system 100 is preferably constructed during a training phase. The final part of the architecture is a fully connected perceptron layer 138. The outcome of the architecture is a quantitative value, or polarity value, 140 representing the semantic significance of input sequence with a value in the interval [0,1]. The learning model, along with the training methods, is part of "Deep Neural Network" functional component of the overall architecture (100). The actual classification algorithm is part of a micro service platform of system 100.

Figure 4:
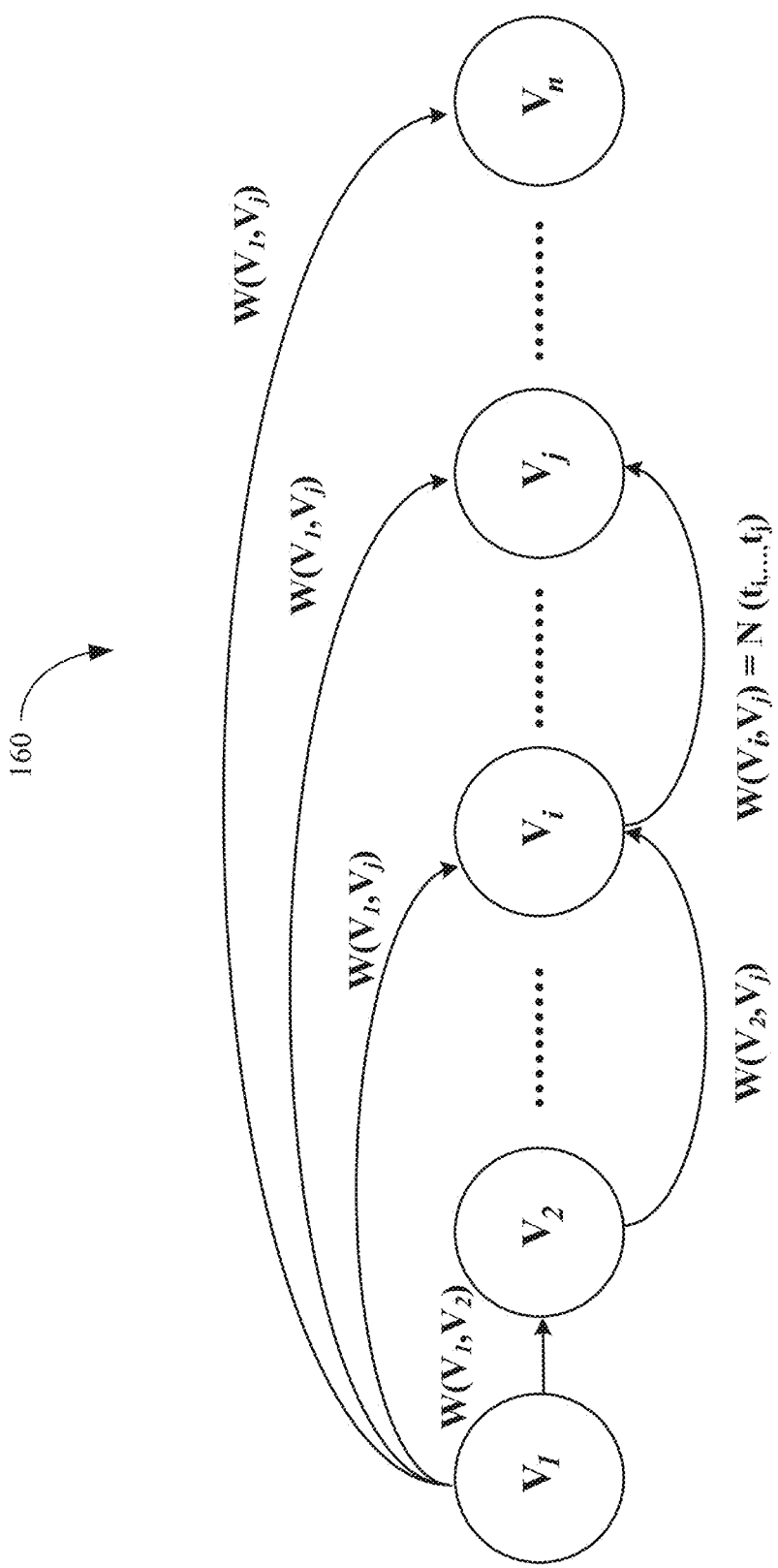
FIG. 4 illustrates various computational relationships of the Supervised Chunking Stage of FIGS. 2 and 3.

Solving the optimal segmentation problem, requires reducing it to an optimization problem on a discrete combinatorial structure. FIG. 4 illustrates a sematic dependency graph 160 of n tokens. The vertices represent the tokens and the edges represent the segments identified by endpoints of the edge. The edge weights represent semantic polarity of corresponding segments More specifically, and as illustrated in FIG. 4, a weighted directed graph G=(T,E), referred to as semantic dependency graph, has a vertex set T={t1, . . . , tn} and edge set E={(vi,vj)|1≤i<j≤n}, where the edge (vi,vj) will characterize the set of tokens <ti, . . . , tj> with edge weight w(vi,vj)=N(ti, . . . , tj). Any directed path P=<t1, ti1, ti2 . . . , tik, tn> from t1 to tn represents a segmentation of token sequence Tinto segments S0=<t1, . . . , ti1>, S1=<ti1, . . . , ti2>, . . . , Sk=<tik, . . . , tn>. T the optimal segmentation T={t1, . . . , tn} is realized by solving the maximum weight path from t1 to tn in semantic dependency graph G. Our method for solving the maximum path graph problem is a combinatorial optimization algorithm that uses relaxation along edges and incrementally constructing a directed path from t1 to tn [4—Quoc Le, Tomas Mikolov; Proceedings of the 31st International Conference on Machine Learning, PMLR 32(2):1188-1196, 2014; this article is hereby incorporated by reference in its entirety as if fully set forth herein]. This algorithm and methodology is very efficient and runs in linear time in terms of number of vertices and edges in the semantic dependency graph. The cost of resulting segmentation is equal to the sum of polarity measures along the individual segments forming the maximum path in graph G. The automatic segmentation algorithm is a micro service of platform 100.

Figure 5:
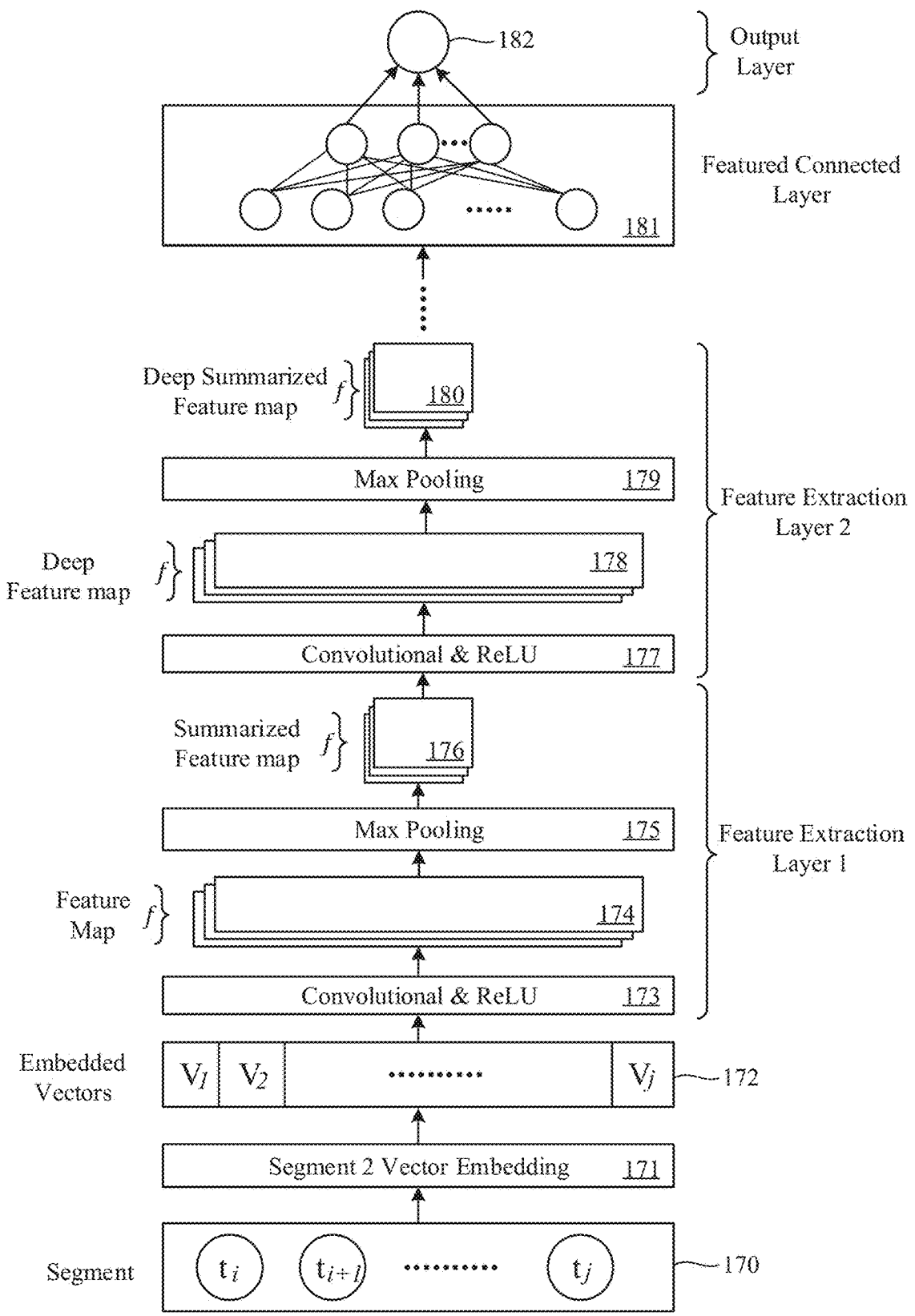
FIG. 5 is a flow diagram of a deep neural network architecture for the Supervised Chunking Stage of FIG. 2.

FIG. 4 provides a schematic representation 160 of one such G constructed on a set of n prescribed tokens. The Document Prioritization and Chunk Ranking step (or stage) 124 organizes the document chunks in terms of their significance with respect to a prescribed periodization. The motivation for imposing such significance measure to different segments to a document is to increase their role and relevance for certain tasks. As an example, the set of experiences and past responsibilities may be more critical for a job applicant in comparison to the set of certificates he or she holds. The idea of prioritization may be viewed as imposing a contextual order (sorting order). The notation of prescribed context is a container for capturing the desired required of analyzing agent for the document. A deep neural network (DNN) framework for analyzing document chunks along with a training model is used to create a general model for creating and imposing this context in a computational framework. The outcome of this neural network for any given text segment S, is a priority value M(S) whose magnitude reflect the significance of Sin the context desired by analyzing agent. Specifically, this neural network will receive a sequence of segments S1, . . . , Sk corresponding to a token sequence T, and generate a permutation of the segment in the form of S'1, . . . , S'k such that M(S'1)≤ . . . ≤M(S'k). The neural network that implements the priority measure M( ) is multi-layer convolutional neural network consistent of three distinct set of layers; embedding layer, convolutional layers, and complete perceptron layers (see FIG. 5). To support the embedding layer we have implemented a sentence to vector architecture similar to Quoc and Mikolov [4—Quoc Le, Tomas Mikolov; Proceedings of the 31st International Conference on Machine Learning, PMLR 32(2):1188-1196, 2014; this article is hereby incorporated by reference in its entirety as if fully set forth herein] that requires pertaining on sample sentences supported by the training and vocabulary construction subsystem. This component is depicted in block 171 and the output is denoted in layer 172. This layer is denoted as segment to word embedding layering (see FIG. 5). The convolutional layers are the recipients of the outcome of embedding layer and act as feature extractors. Each feature extraction layer consists of a convolutional filter layer, ReLU optimization, and max-pooling sub-layers [5—Kim, Y. (2014). Convolutional Neural Networks for Sentence Classification. Proceedings of the 2014 Conference on Empirical Methods in Natural Language Processing (EMNLP 2014), 1746-1751; this article is hereby incorporated by reference in its entirety as if fully set forth herein]. These components are denoted by blocks 173 through 179 in FIG. 5. The outcome of these steps is denoted by deep summarized features in block 180 of FIG. 5. The final perceptron complete layer (fully connected layer in block 181 of FIG. 5) is responsible for generating the outcome corresponding to functional value M( ). The final outcome of network is denoted by label 181 in FIG. 5. The entire learned model along with training processes are part of our deep neural network model of our platform. The classification methods and wrappers along with the access to output measures M( ) are part of our micro-service platform.

The Semantic Characterization step (or stage) 126 provides the semantic characterization of prioritized segments in concept-space. There are two objectives for representing text snippets in concept-space. First, the concept-based representation provides the platform 100 with a concise, unbiased computational (vector-based) model for encoding text in natural language. This representation utilizes a finite but comprehensive set of coordinates that allows for domain context to be incorporated into platform 100. Second, representing all text-based entities of platform 100 in such a canonical space, using finite dimensional vectors, will allow for direct comparison of entities in terms of their conceptual coordinates. This in turn will reduce the problem of semantically comparing two natural language text snippets to that of comparing two vectors in a finite space. The concept-space representation and its use for natural language text similarity comparison is the subject of our prior patent application [6—Andrew Buhrmann, Michael Buhrmann, Ali Shokoufandeh, Jesse Smith, Yakov Keselman, Kurtis Peter Dane, Systems and Methods to Determine and Utilize Conceptual Relatedness between Natural Language Sources. U.S. Patent Application Publication Number: 2016/0232160; this application is hereby incorporated by reference in its entirety as if fully set forth herein]. The mechanisms for computing the concept-based representation, as well as, computational framework for concept-base similarity is provide by microservice 127.

Platform 100 has several significant properties that will make it unique for mission driven text processing. Specifically, in additional to syntactical analysis of most preprocessing pipelines, our framework is capable of identifying and sub-segments of natural text which capture most relevant information from text most relevant to a learned model relevant to an organization or a task. Moreover, the identified segments are ranked with respect to a priority function modeled and trained by an organization or a task. Finally, the extracted and prioritized information will be augmented with concept-based representation to support semantic comparison. In summary, our technology is able to support trainable pipelines that can detect what is important in a text, how import it is, and what its semantic content is.

A Semantic Relatedness and Optimization process 116 based on coverage problem (FIG. 7) enables system 100 to model and analyze the structure of a team's human capital and their skill sets and relate those to a set of organizational objective and requirements. Establishing these structural relationships allows system 100 to solve a series of problems including team and gap analysis, team optimization, and talent recommendation. The semantic relatedness and optimization macro-service is built on a set of data science micro-services of platform 100, the semantic relatedness macro-service provides a computational framework for formulating and solving the above problem using computationally accurate and efficient optimization algorithms. Data science micro services allows the preprocessing of the information sources descripting talent pool, organization objects, and desired experiences and skill, job requirements in a prioritized concept-bases representation. The latter representation enables direct comparison of all entities of an organization using semantic similarity measures.

Figure 6:
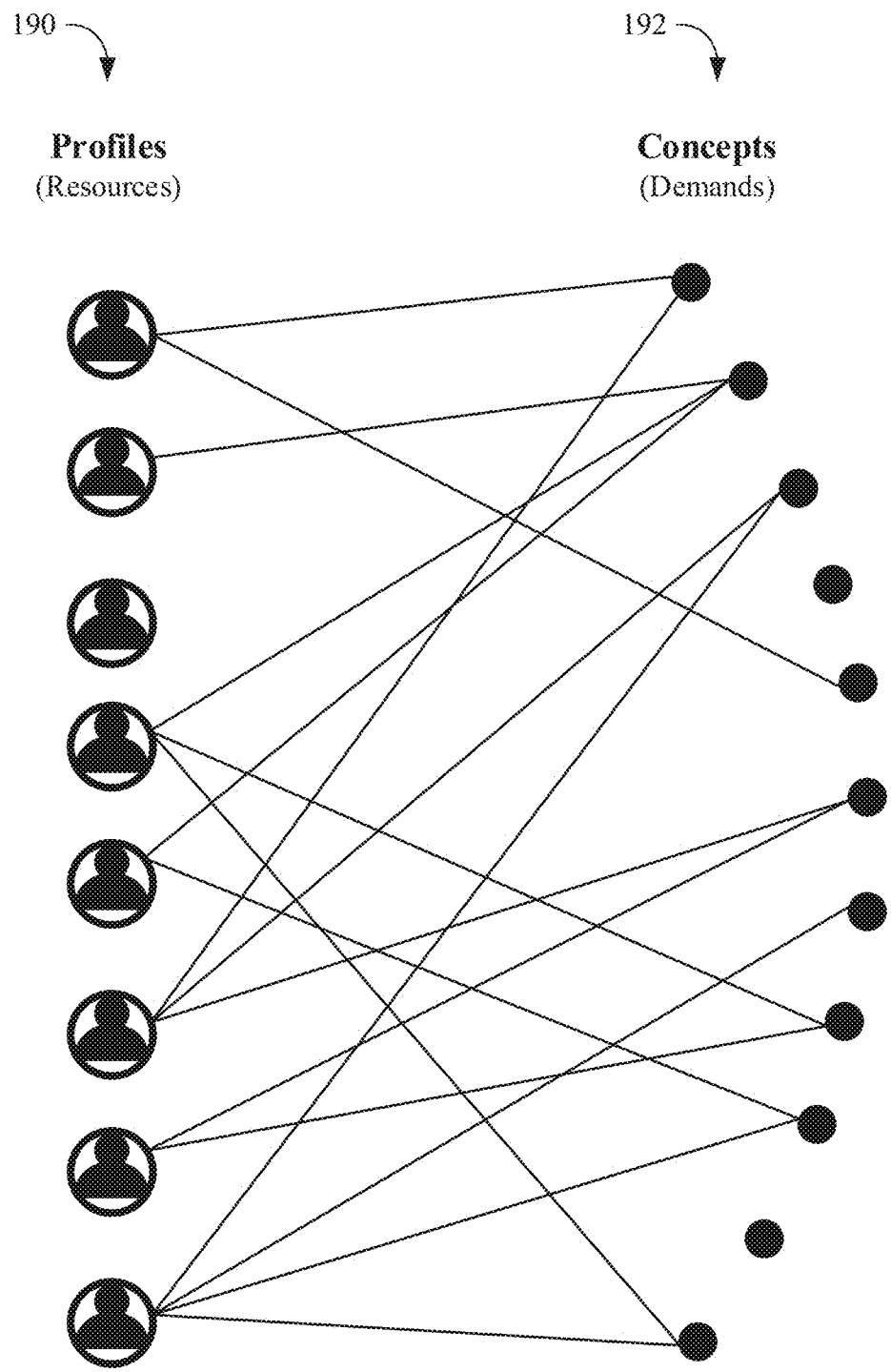
FIG. 6 is a bipartite graph related to the Semantic Relatedness and Optimization component the platform of FIG. 1; and, FIG. 7 is a process flow chart of team optimization conducted in accordance with the platform of FIG. 1.

Specifically, a typical analysis problem is modeled as optimization problems in a supply network defined by resources (talent pool, team skill set, etc.) and demands (team objective, required experiences, team responsibilities). As an example of a problem or case solvable by system 100, consider the problem of identifying the talent gap in a team of skilled board members and the expected objective of board as identified by organizational goals. To formulate the corresponding optimization problem, a combinatorial model for the underlying entities is created. More specifically, a bipartite weighted graph B=(U+V, E) [7—Schrijver, Alexander. Combinatorial optimization: polyhedra and efficiency. Vol. 24. Springer Science & Business Media, 2003; this article is hereby incorporated by reference in its entirety as if fully set forth herein] is used. The vertex sets consisting of two disjoint subsets U and V. The set U represents the set of team members characterized in concept space terms of their skill sets and experiences. The set V will represent the set of organization objectives and prioritized modeled in the concept space. Each edge in set E will capture the relationship between a team member u and the specific business objective v in terms of the strength of their semantic relatedness $w(u,v)$ as measured by their concept similarity. FIG. 6 is a schematic depiction of this bipartite graph, where the nodes in left set 190 represent the team members and the nodes in the right vertex set 192 represent the specific business objectives characterized in terms of their concept representation and the edges and their corresponding strengths represent the sematic relatedness between team members and semantic concepts associated with objectives.

Tackling Gap and Talent Analysis Problems: Given a subset U' of vertices in set U (subset of team members) its objective coverage will be sub set V' of V such that each element in V' is connected to an element of U' via an edge. The strength of a (U', V') coverage can be computed using the sum of weights of edges of the form $w(u,v)$ with u belonging to U' and v belonging to V'. We can be formulated large number organization dynamic optimization problems as variations of coverage problems in bipartite graph B [8—Srinivasan, Aravind. "Improved approximations of packing and covering problems." Proceedings of the twenty-seventh annual ACM symposium on Theory of computing. ACM, 1995; this article is hereby incorporated by reference in its entirety as if fully set forth herein]. For example, the bipartite graph B itself represent the coverage of current team for the required objective. If a particular vertex in set V does not have an adjacent vertex in set U, the implication is that the one of the requirements/objectives is not currently met with the team members. We can also qualitatively evaluate the quality current coverage in terms of coverage weight $W(U, V)$. The structure of bipartite itself provide invaluable information about the quality and complexity of coverage. For example, a vertex u in set U with maximum number of outgoing edges can be an indicator for the versatility of team member in meeting organizational objectives. The total weight of all out going edges from a vertex corresponding to a team member is an indication of their strength in meeting the objectives of the organization. The density of edges adjacent to a vertex that represents an objective quantifies the overall contribution of the team to that objective. The algorithmic implementation of these structural problems form the gap and talent analysis macro-services supported by our platform.

Platform 100 supports Team Dynamics and Recommendation Problems. Another set of optimization question are the "what if" scenarios that system 100 supports. For example, consider the scenario that an organization is interested in evaluating how an existing team can handle a set of new objectives/tasks. A straightforward solution to this problem is to update the bipartite graph B, adding the new objectives as vertices to set V, creating all possible edges and their associated weights between vertices in set U and those of augmented set V. The quality of the new bipartite graph B is an indicator of how well the current team can meet the new objectives. In a similar fashion, the effect of a new team member on the qualitative coverage of objective, may be evaluated by adding new team member as vertex to set U and including all possible edges between this newly added vertex and objectives in set V. Again, the change in the quality of coverage as the result of this structure change is an indication of overall effect of the new team member on the organization's objective. The final consequence of this model is that system 100 provides a system and method to improve the quality of the team or associated objectives. For example, using the concept representation of unsatisfied objectives or uncovered constraints as search criteria for a recommendation problem, i.e., identify the best candidate for team enhancement using our job-seeker search and ranking system is one application. All the aforementioned constructs, procedural use cases, and optimization process will be computational components of semantic relatedness and optimization platform and will provide necessary support to implement processes such as talent and gap dynamics analysis and recommendation services.

Figure 7:
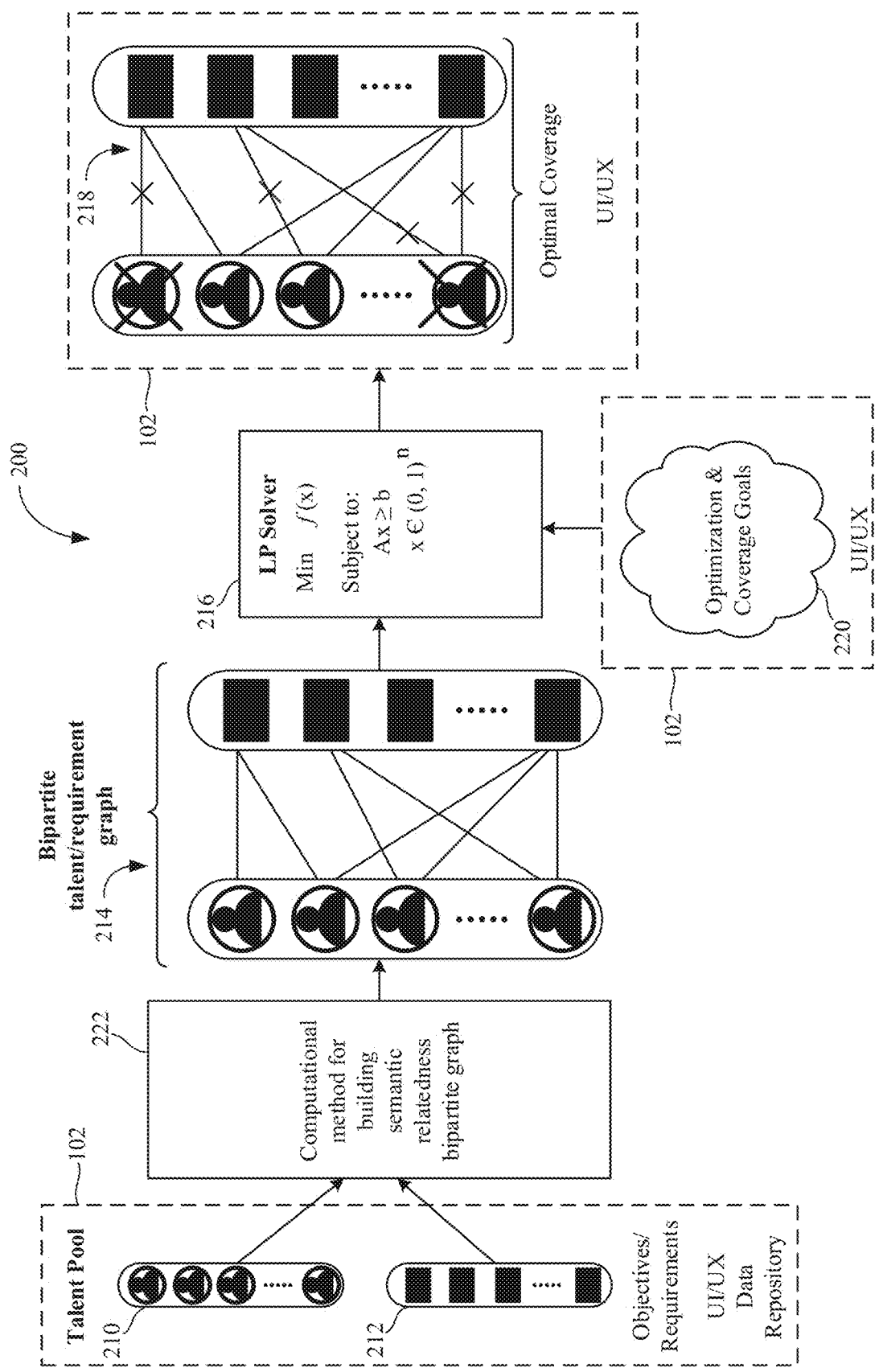

With reference to FIG. 7, the above bipartite representation for modeling coverage serves as the basis for several optimization problems including optimal team building 200.

Specifically, given a pool candidates $P=\{p1, \ldots, pn\}$ 210 and a set of objective concepts (demands) $D=\{d1, \ldots, dm\}$ 212, it is desirable to select a subset of k candidates $P'=\{p'1, \ldots, p'k\}$ (uncrossed team members) of P to form a team that meets certain organization requirements 220. A set of costs $C=\{c1, \ldots, cn\}$ associated with set P, where ci denotes the cost associated with adding pi to P'. As an example, assuming that selecting every candidate will result in the same cost, then ci=1 for i=1, ..., n. One possible goal for coverage can be ensuring that each objective is covered by at least one team member. Additional constraints such as size of the team (|P'|), quality of coverage of each objective, etc. may be included in the analysis. An integer linear programming solution 216 is used to solve these and similar problems. More precisely, let xi denote the indicator variable that will indicate whether team member pi will be selected during the optimization. Namely, if xi=1 then ci will be part of the optimal solution. To capture this computationally, multiplying multiplication ci xi will provide appropriate contribution from element "I" toward cost function. Considering all possible values of "I" provides a total contribution of c1 x1+ . . . +cn xn. The objective function of the optimization problem is to minimize the above sum over all possible assignments of x1, . . . , xn The coverage relatedness requirement states that for each objective dj the selected team members should provide at least a coverage of Lj. This latter constraint can be formulated as $w(p1,dj)x1+w(p2,dj)x2+ \ldots +w(pn,dj)xn \geq Lj$. Note that, if Lj is to be 1, each objective is covered by at least one team member. We can also formulate the size requirement (K) for the team as linear condition $x1+ \ldots +xn \leq K$. The overall process of generating semantic relatedness bipartite graph 214 as well it construction and use of linear integer programming 216 for talent optimization 218 is illustrated in FIG. 7. The resulting integer linear-programming 216 can be efficiently estimated using generic primal-dual algorithm [9—Vazirani, Vijay V. Approximation algorithms. Springer Science & Business Media, 2013; this article is hereby incorporated by reference in its entirety as if fully set forth herein]. This process is the core macro-service for talent optimization of platform 100.

In accordance with an embodiment of the present invention, the Semantic Relatedness and Optimization Platform stage 116 (FIG. 1) provides: a bipartite graph representation of talent-pool and requirements of an origination is novel and provides a computational model for organizational optimization problem; efficient computational solutions for gap and talent analysis problems in an organization; and, integer linear programming solution for restricted coverage and team formation.

This specification is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the disclosure may omit, or include a modification of, one or more features or functionalities described in the context of such absolute terms.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special-purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry desired program code means in the form of computer-executable instructions or data structures and which can be accessed by a general purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special-purpose computer, or special-purpose processing device to perform a certain function or group of functions. In some embodiments, computer-executable instructions are executed on a general-purpose computer to turn the general-purpose computer into a special-purpose computer implementing elements of the disclosure. The computer executable instructions may be, for example, binaries, intermediate format instructions such as assembly language, or even source code.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

While the preferred embodiment of the disclosure has been illustrated and described, as noted above, many changes can be made without departing from the spirit and scope of the disclosure. Accordingly, the scope of the described systems and techniques is not limited by the disclosure of the preferred embodiment. Instead, the described systems and techniques should be determined entirely by reference to the claims that follow.

The invention claimed is:

1. A microprocessor executable method to transform unstructured natural language texts by way of a preprocessing pipeline, into a structured data representation of the entities described in the original text wherein, the structured data representation is conducive to further processing by machine methods, and the process of the transformation is learned by a machine neural network or other machine learned model trained to identify relevant text segments and disregard irrelevant text segments such that the resulting structured data representation is refined to more accurately represent the respective entities.

2. A microprocessor executable method decomposing a natural language document into a sequence of text excerpts or segments, the microprocessor executable method comprising:

dividing the text into a sequence of small fragments;
using a machine learned model to classify each possible recombination of those fragments; and,
optimizing over the possible result sequences to obtain an ideal segmentation, wherein the optimizing step further comprises relation detection using our proposed bipartite graph-based optimization.

* * * * *